(12) United States Patent
Chagnot et al.

(10) Patent No.: US 7,841,381 B2
(45) Date of Patent: Nov. 30, 2010

(54) HEAT AND ENERGY RECOVERY VENTILATORS AND METHODS OF USE

(75) Inventors: Catherine J. Chagnot, Athens, OH (US); Jason Morosko, Athens, OH (US); Louis Sulfstede, Irving, TX (US)

(73) Assignees: Stirling Technology, Inc., Athens, OH (US); Sulfstede Consulting Services, Inc., Irving, TX (US)

( * ) Notice: Subject to any disclaimer, the term of this patent is extended or adjusted under 35 U.S.C. 154(b) by 1622 days.

(21) Appl. No.: 11/112,979

(22) Filed: Apr. 22, 2005

(65) Prior Publication Data

US 2005/0236150 A1 Oct. 27, 2005

Related U.S. Application Data

(60) Provisional application No. 60/564,474, filed on Apr. 22, 2004.

(51) Int. Cl.
F24F 7/08 (2006.01)
(52) U.S. Cl. .............. 165/8; 165/54; 165/909; 62/262; 62/263; 312/236
(58) Field of Classification Search .......... 165/8, 165/54, 909; 62/262, 263; 312/236
See application file for complete search history.

(56) References Cited

U.S. PATENT DOCUMENTS

| | | | | |
|---|---|---|---|---|
| 3,701,912 | A | * | 10/1972 | Schulze et al. ............... 310/90 |
| 3,819,244 | A | * | 6/1974 | Paulick et al. ............... 312/101 |
| 4,513,809 | A | | 4/1985 | Schneider et al. |
| 4,633,680 | A | * | 1/1987 | Lang et al. .................... 62/507 |
| 4,653,575 | A | * | 3/1987 | Courchesne ................. 165/54 |
| 4,727,931 | A | | 3/1988 | Berner et al. |
| 4,825,936 | A | | 5/1989 | Hoagland et al. |
| 5,003,961 | A | | 4/1991 | Besik |
| 5,285,842 | A | | 2/1994 | Chagnot |
| 5,423,187 | A | | 6/1995 | Fournier |
| 5,431,215 | A | | 7/1995 | Davis |
| 5,497,823 | A | | 3/1996 | Davis |
| 5,992,160 | A | | 11/1999 | Bussjager et al. |
| 6,039,109 | A | | 3/2000 | Chagnot et al. |
| 6,169,849 | B1 | * | 1/2001 | Schmidt .................... 392/344 |

(Continued)

FOREIGN PATENT DOCUMENTS

CA 2418425 A1 8/2003

(Continued)

*Primary Examiner*—John K Ford
(74) *Attorney, Agent, or Firm*—Dinsmore & Shohl LLP

(57) ABSTRACT

An energy recovery ventilator and method for monitoring and maintaining an environmental condition inside a structure such as a house, building, or dwelling is provided. The ventilator may include a housing having mating halves of a molded polymeric material, first and second chambers disposed within the housing to convey separate first and second streams of air, a heat exchanger configured to intersect the first and second chambers, a first fan to circulate the first air stream through the first chamber, a second fan to circulate the second air stream through the second chamber, and a fan motor driving the first and second fans. The ventilator may also be configured to prevent frost build-up in or on the energy ventilator, to provide efficient cooling, and maintain one or more desired environmental conditions.

7 Claims, 15 Drawing Sheets

U.S. PATENT DOCUMENTS

| | | |
|---|---|---|
| 6,196,469 B1 * | 3/2001 | Pearson .................... 236/49.3 |
| 6,233,824 B1 | 5/2001 | Dobbs et al. |
| 6,238,023 B1 * | 5/2001 | Choi ......................... 312/101 |
| 6,289,974 B1 | 9/2001 | DeGregoria et al. |
| 6,355,091 B1 | 3/2002 | Felber et al. |
| 6,408,932 B1 | 6/2002 | Steele et al. |
| 6,545,729 B1 * | 4/2003 | Lowe ......................... 348/836 |
| 6,557,365 B2 | 5/2003 | Dinnage et al. |
| 6,684,943 B2 | 2/2004 | Dobbs et al. |
| 2002/0139514 A1 | 10/2002 | Lagace et al. |

FOREIGN PATENT DOCUMENTS

| | | |
|---|---|---|
| CA | 2 237 236 | 9/2003 |
| EP | 0 413 184 A | 2/1991 |
| JP | 62094746 A * | 5/1987 |
| JP | 62228829 A * | 10/1987 |

* cited by examiner

HEAT AND ENERGY RECOVERY VENTILATORS AND METHODS OF USE

CROSS REFERENCE TO RELATED APPLICATION

This application claims the benefit of provisional application No. 60/564,474, filed Apr. 22, 2004.

BACKGROUND OF THE INVENTION

The present invention generally relates to heat and energy recovery ventilators. More particularly, the present invention relates to heat and energy recovery ventilators used to obtain thermally efficient ventilation of structures such as rooms, houses, buildings, and/or dwellings, and in particular, to those ventilators that include variable speed motors that are used to control a number of characteristics of air, heat, and humidity transfer through an enclosed space.

Heat recovery ventilators are installed in residential, commercial, and industrial buildings to extract and remove heat from one air stream and transfer the heat to a second air stream, wherein energy recover ventilators are installed in these structures to extract and remove both heat and moisture from one air stream and transfer the heat and moisture to a second air stream. In particular, rotary wheel heat and/or energy recovery ventilators are known, wherein a wheel rotates in a housing through countervailing streams of exhaust and fresh air, in the winter extracting heat and/or moisture from the exhaust stream and transferring it to the fresh air stream. In the summer, rotary wheel heat exchangers extract heat and moisture from the fresh air stream and transfer it to the exhaust stream, preserving building air conditioning while providing desired ventilation.

Blowers (e.g., a fan and a motor driving the fan) typically are used to create pressures necessary for the countervailing streams of exhaust and fresh air to pass through the heat exchanger (e.g., a rotary wheel heat exchanger). Some ventilators, however, are designed for use in existing heating, ventilating, and air conditioning (HVAC) systems that have sufficient air pressure to drive the countervailing streams, and may or may not also include blowers.

Such ventilators are generally fabricated using a metal internal support structure to provide a mechanical support function, i.e., connect and support all the internal components such as motors, fans, heat exchanger, etc. Typically, these ventilators also include an insulation layer outside of the internal support structure to prevent condensation from building up in and on the ventilator. Finally, an outer housing of sheet metal is placed over the internal housing and insulation to provide an outer protection of the internal components. This conventional configuration makes heat and energy recovery ventilators relatively expensive, and/or excessively labor intensive to manufacture. Unfortunately, the insulation alone does not always prevent condensation, and ultimately frost, from building up in the ventilator, particularly in extremely cold climates. Frost build-up in the ventilator is undesirable because it lowers the efficiency and/or ventilation rate of a heat exchanger within the ventilator and thus increases the operating costs of the ventilator.

In addition, many current heat and energy recovery ventilators require manual balancing of the incoming versus the outgoing air streams in order to achieve either a desired balanced or slightly imbalanced flow to the structure. When the flow of air streams are balanced, the incoming (i.e., supply) volumetric air flow ($ft^3$/min) is equal to the outgoing (i.e., return or exhaust) volumetric air flow ($ft^3$/min). Alternatively, the flow of air streams may be imbalanced such that the flow ($ft^3$/min) of one air stream (e.g., supply) is greater than the flow ($ft^3$/min) of the other air stream (e.g., return), thus causing a pressure differential between the interior and exterior of a structure. For example, a balanced, or slightly indoor positive (i.e., positive pressure inside the structure relative to outside the structure), pressure differential between the interior and exterior of a structure may be desired to prevent air and moisture from infiltrating into the structure from the outside to reduce the formation of mold and other undesirable conditions within the structure. The balanced pressure differential prevents sucking humidity from the outside into the wall cavities of the structure due to indoor negative pressure, or pushing humidity from inside the structure into the wall cavities due to a large positive indoor pressure differential.

As described above, conventional heat and energy ventilators require manual balancing of the these streams to attempt to maintain this pressure differential between inside and outside the structure. The conventional control systems have controlled either motor speed (constant RPM) or motor power draw (applied torque, e.g., constant torque) to control or balance the airstreams' velocities.

In general, current ventilators have not been configured to independently adjust the speed of the blowers and/or the rotational speed of the heat exchanger within the ventilator to maintain a desired environmental condition inside the structure in response to continuous measurements of environmental conditions such as humidity, temperature, and/or pressure. Accordingly, a need still exists for improved heat and energy recovery ventilators.

SUMMARY OF THE INVENTION

Accordingly, the present invention is intended to address and obviate problems and shortcomings and otherwise improve previous heat and energy recovery ventilators and their operation.

One exemplary embodiment of the present invention provides an energy recovery ventilator that includes a housing comprising mating halves of a molded polymeric material. This housing includes a supply chamber and a return chamber disposed within the housing to convey separate first and second streams of air, respectively. A heat exchanger is configured to intersect the supply and return chambers within the housing. The ventilator also may include a supply fan to circulate the supply air stream through the supply chamber and a return fan to circulate a return air stream through the return chamber. Both fans may be connected to a fan motor, which drives each fan.

Another exemplary embodiment of the present invention provides an energy recovery ventilator configured to maintain a desired environmental condition within a structure. Such a ventilator includes a housing having a supply chamber and a return chamber within it to convey separate supply and return streams of air, a heat exchanger configured to rotate about a central axis within the housing and to intersect the supply and return air streams, a heat exchanger motor configured to rotate the heat exchanger about the central axis, a supply fan driven by a supply motor, a return fan driven by a return motor, a controller in communication with the supply, return, and heat exchanger motors, and a sensor in communication with the controller and configured to measure an environmental condition. This controller may be configured to independently operate each of the supply, return, and heat exchanger motors in response to the measured environmental condition in order to maintain the desired environmental condition.

Still another exemplary embodiment of the present invention provides an energy recovery ventilator for controlling humidity within a structure. The ventilator includes a housing and supply and return chambers disposed within the housing to convey separate supply and return streams of air. A heat exchanger is configured to rotate about a central axis within the housing. The heat exchanger intersects the supply and return chambers within the housing. The ventilator also may include a supply fan to circulate the supply air stream through the supply chamber and a return fan to circulate the return air stream through the return chamber. A supply fan motor drives the supply fan, a return fan motor drives the return fan, and a heat exchanger motor is configured to rotate the heat exchanger about the central axis. The ventilator includes a controller that is in communication with the supply, return, and heat exchanger motors. A first sensor communicates with the controller and configured to measure indoor humidity and a second sensor communicates with the controller and configured to measure outdoor humidity. The controller may be configured to operate each of the supply, return, and exchange motors in response to the measured indoor and outdoor humidity to maintain a desired humidity within the structure.

Yet still another exemplary embodiment of the present invention provides an energy recovery ventilator for continuously maintaining a desired pressure differential between inside and outside of a structure. The ventilator includes a housing and supply and return chambers disposed within the housing to convey separate supply and return streams of air. A heat exchanger is configured to intersect the supply and return chambers within the housing. The ventilator also includes a supply fan to circulate the supply air stream through the supply chamber and a return fan to circulate the return air stream through the return chamber. A supply fan motor drives the supply fan and a return fan motor drives the return fan. The ventilator may include a controller that communicates with the supply and return motors. The controller may also communicates with a pressure differential sensor that is configured to continuously measure the differential pressure between inside and outside of the structure. Such a controller may be configured to operate the supply and return fan motors in response to said pressure differential to maintain the desired pressure differential.

An exemplary embodiment provides a method of continuously monitoring indoor and outdoor environmental conditions to maintain a desired condition inside a structure. This method includes continuously measuring indoor and outdoor environmental conditions using sensors, controlling a supply fan of an energy recovery ventilator configured to circulate a supply stream of air into the structure in response to the measured environmental conditions, controlling a return fan of the ventilator configured to circulate a return stream of air out of the structure in response to the measured environmental conditions, and controlling rotation of a heat exchanger of the ventilator in response to the measured environmental conditions. The method maintains the desired environmental condition inside the structure based upon the measured environmental conditions.

BRIEF DESCRIPTION OF THE DRAWINGS

While the specification concludes with claims particularly pointing out and distinctly claiming the invention, embodiments of the invention will be better understood from the following description taken in conjunction with the accompanying drawings in which:

Figure 1:
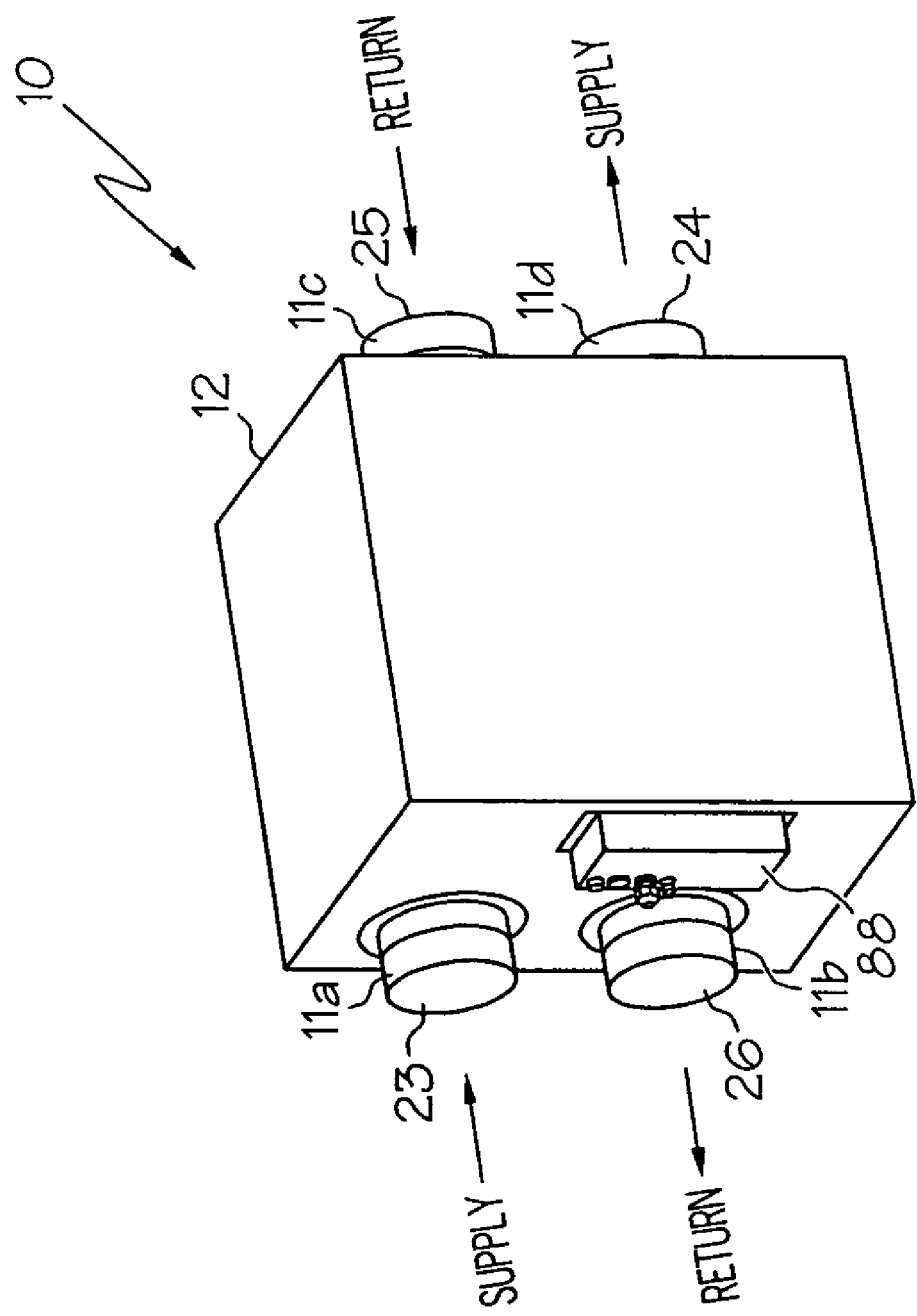
FIG. 1 is a perspective view of an exemplary embodiment of the energy recovery ventilator according to the present invention.

The embodiments set forth in the drawings are illustrative in nature and not intended to be limiting of the invention which is defined by the claims. Moreover, individual features illustrated in the drawings will be more fully apparent and understood with reference to the following detailed description.

DETAILED DESCRIPTION OF THE PREFERRED EMBODIMENT

Reference will now be made in detail to various embodiments of the invention, examples of which are illustrated in the accompanying drawings, wherein like numerals indicate similar elements throughout the views.

The present invention provides an improved, low cost energy recovery ventilator (hereinafter, "ERV") for a structure such as a house, commercial or industrial building, dwelling, room, or any other enclosed space. An ERV transfers two different kinds of heat between a supply air stream and a return (e.g., exhaust) air stream, which are flowing through it. Sensible heat is measured with a thermometer and is the difference between the incoming (supply) and outgoing air temperature (return). The measurement of the sensible heat recovered is referred to as apparent sensible effectiveness and is expressed in a percent. Latent heat is the heat that was originally required to evaporate the moisture from a liquid into a gas and is an important consideration in the energy recovered, the energy necessary to recondition the incoming air, and the comfort and health of the occupants in the space being ventilated. The measurement of latent heat recovery is referred to as Sensible Recovery Efficiency and is expressed as a percentage. Although the present invention is shown and described with reference to an energy recovery ventilator, it may comprise a heat recovery ventilator without departing from the spirit and scope of the present invention.

The ERV of the present invention has demonstrated an improved energy recovery efficiency over conventional ERVs. The testing of the ERV was performed in general accordance with CAN/CSA-C439-00, Standard Methods of Test for Rating The Performance of Heat Recovery Ventilators, and was conducted in accordance with normal professional standards. Table 1 below illustrates the ERV's (of the present invention) performance.

TABLE 1

| | Supply Temperature | | Net Airflow | | Supply/Exhaust Flow Ratio | Avg. Power Watts | Sensible Recovery Efficiency | Apparent Sensible Effective- ness | Net Moisture Transfer |
|---|---|---|---|---|---|---|---|---|---|
| | C. | F. | L/s | cfm | | | | | |
| Heating | 0 | 32 | 34 | 72 | 0.98 | 43 | 87 | 95 | 0.74 |
| | 0 | 32 | 62 | 131 | 1.00 | 81 | 84 | 91 | 0.64 |
| | 0 | 32 | 89 | 189 | 1.02 | 167 | 80 | 89 | 0.51 |
| | −8 | 18 | 36 | 76 | 0.98 | 45 | 85 | 93 | 0.41 |
| | −15 | 5 | 52 | 110 | 0.99 | 230 | 69 | 89 | 0.59 |
| Cooling | 35 | 95 | 36 | 76 | 1.00 | 56 | 62 | N/A | N/A |
| | 35 | 95 | 55 | 117 | 1.02 | 97 | 51 | N/A | N/A |

Figure 2:
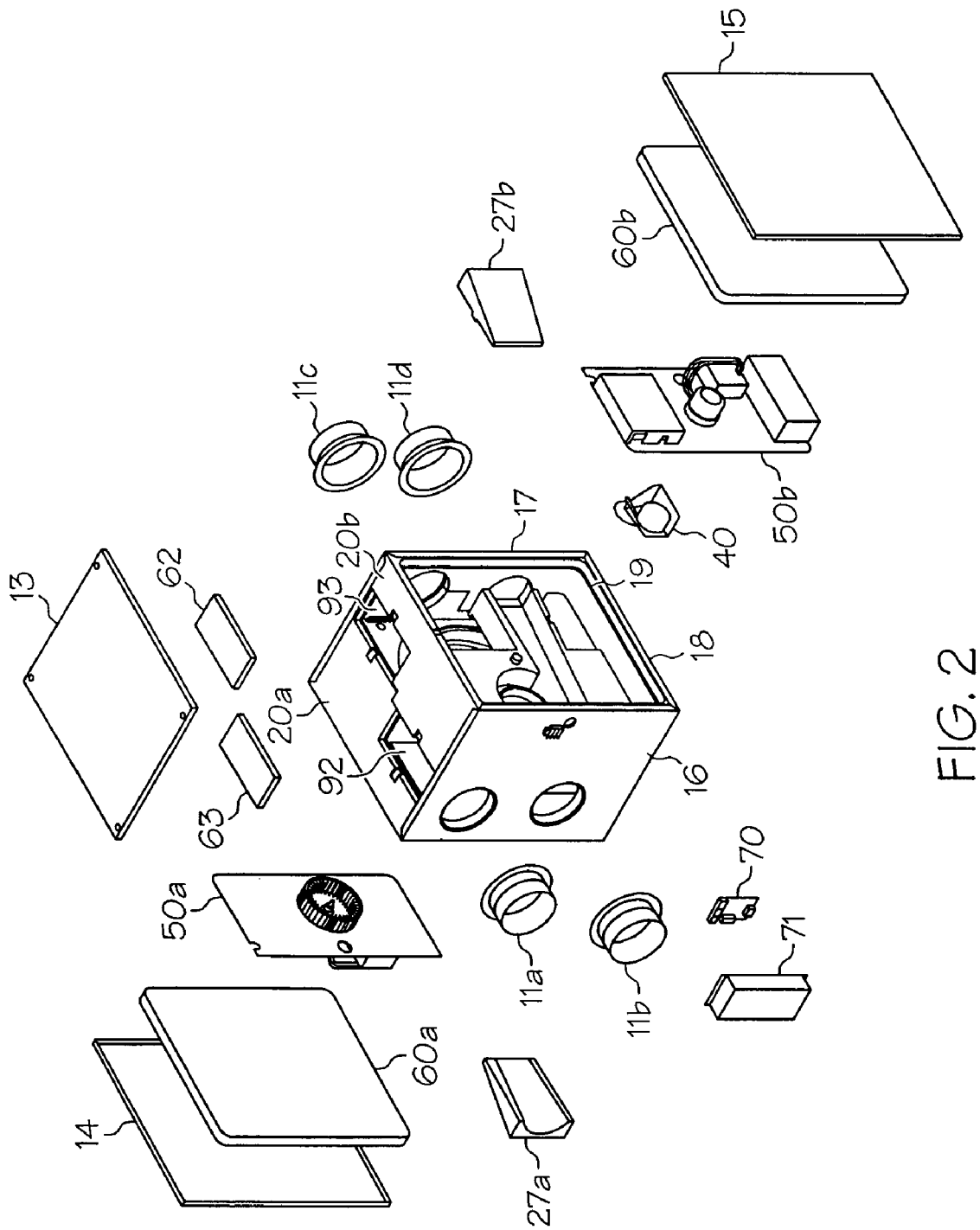
FIG. 2 is an exploded, perspective view of the ventilator illustrated in FIG. 1.
Figure 3B:
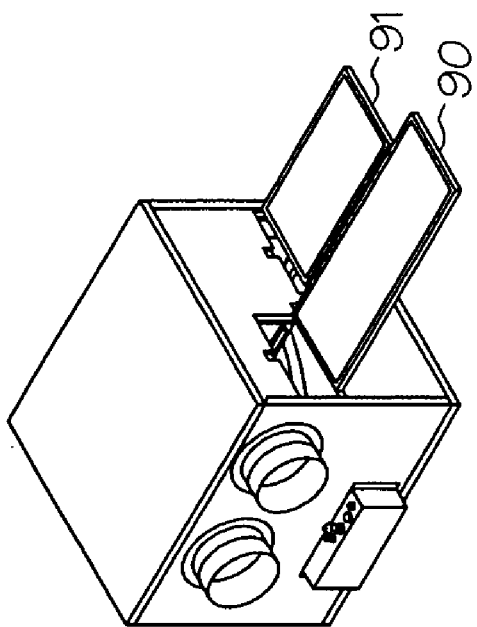
FIG. 3 is a perspective view of the ventilator illustrated in FIG. 1 in both a horizontal and vertical installation orientation.
Figure 3A:
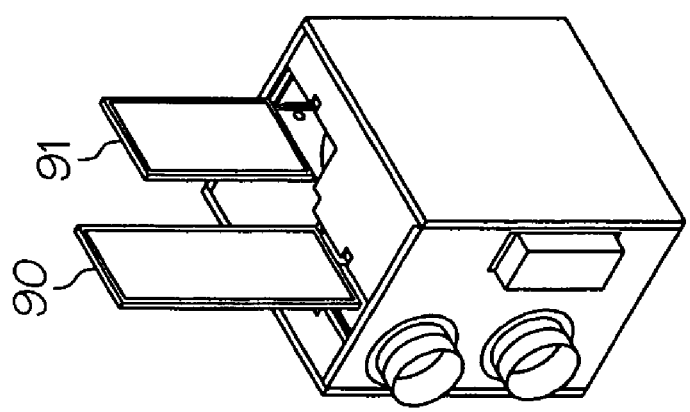
Figure 4:
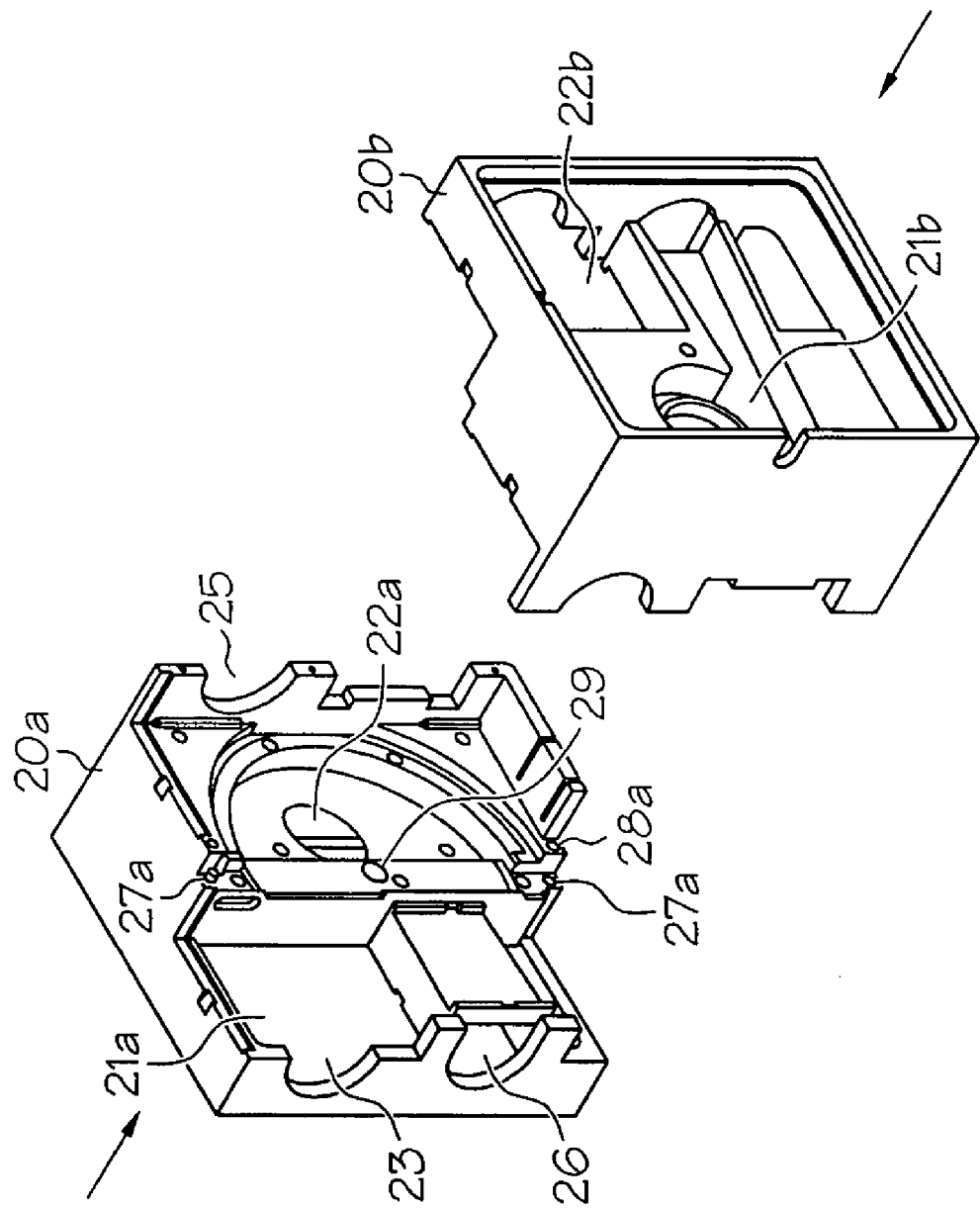
FIG. 4 is a perspective view of a first internal housing and a second internal housing of the ventilator illustrated in FIG. 1.
Figure 5:
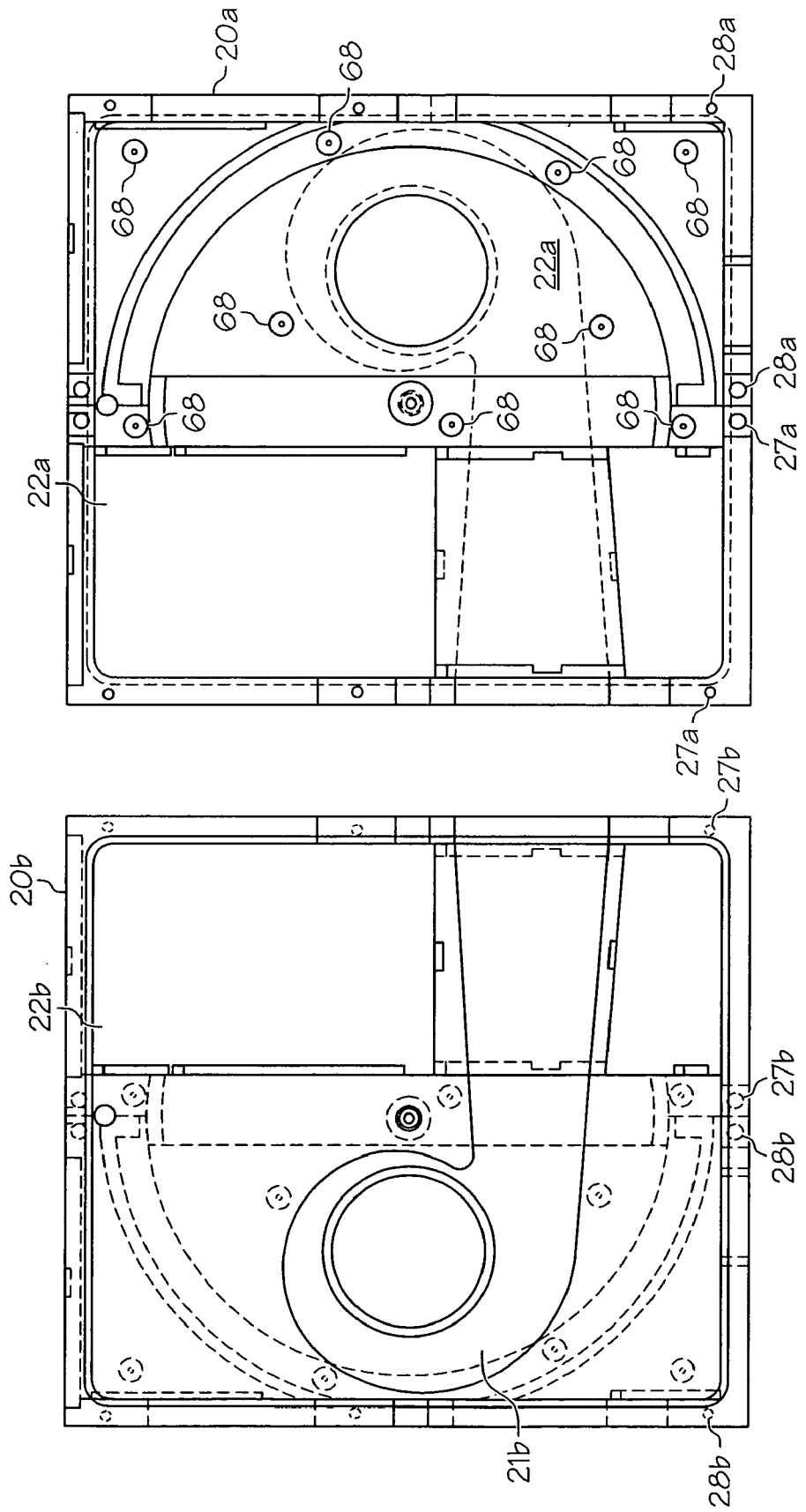
FIG. 5 is a side elevational view of the first and second internal housings of the ventilator illustrated in FIG. 1.
Figure 6:
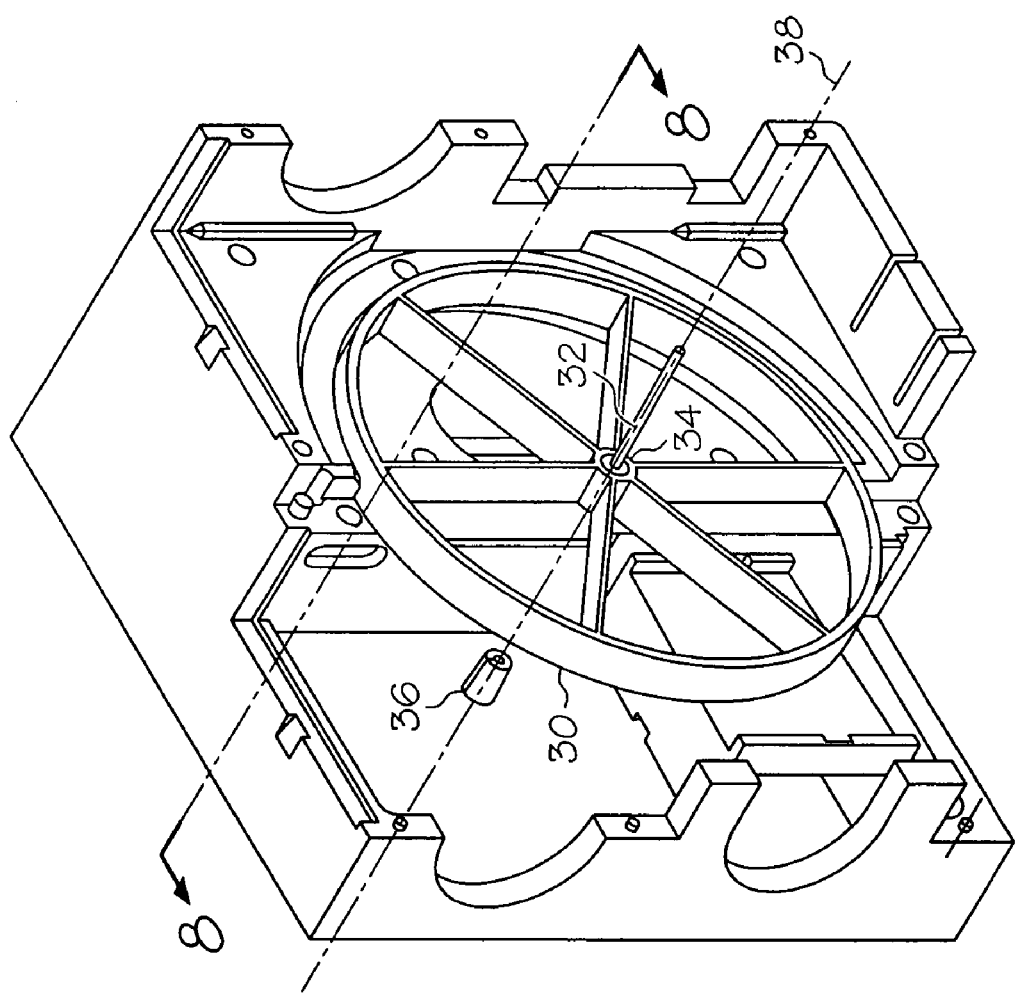
FIG. 6 is a perspective view of the first internal housing and a heat exchanger of the ventilator illustrated in FIG. 1.

Referring to FIGS. 1-12, an exemplary embodiment of an ERV 10 of the present invention is shown as generally including an external housing 12, an internal housing having a first internal housing 20a and a second internal housing 20b, a supply inlet 23, a supply outlet 24, a return inlet 25, a return outlet 26, a heat exchanger 30, a supply fan 54a, a return fan 54b, one or more fan motors (e.g., 52a and 52b), a heat exchanger motor 42, a controller 70, and one or more sensors 86. FIG. 1 shows ERV 10 assembled and ready to be installed inside or outside a structure. In the exemplary embodiment, ERV 10 optionally includes collars 11a-11d that are conventionally connected to external housing 12 at each of the ERV's inlets and outlets. Collars 11a-11d serve as connection points for ductwork to be attached to the ERV. As shown in this exemplary embodiment of the present invention, ERV 10 has a substantially rectangular shape. However, it is understood that it may be constructed to have a variety of shapes, sizes, and configurations as is known to one of ordinary skill in the art. For example, ERV 10 may be installed in a vertical or horizontal orientation as shown in FIG. 3.

External housing 12 may be made from conventional materials, including but not limited to plastics, metals (e.g., sheet metal, aluminum, steel, etc.), composite materials, and any other known or yet-to-be developed material. In the exemplary embodiment, external housing 12 is made from sheet metal and serves to keep out dirt, debris, and other unwanted particles out of the ERV and to protect the internal components. However, in this exemplary embodiment, external housing 12 does not serve as a mechanical support for the ERV's internal components such as the fan, motors, etc. This saves money in the manufacturing of ERV 10. However, if desired, external housing 12 could provide a mechanical support function. FIG. 2 shows external housing 12 as including a top access panel 13, two side access panels 14 and 15, a front side panel 16, a back side panel 17, and a bottom panel 18. All the external housing panels 13, 14, 15, 16, 17, and 18 may be permanently or removably attached to first and second internal housings 20a and 20b using conventional connection methods such as snap-fit, screws, glue, etc. For example, top access panel 13 and two side access panels 14 and 15 may be removably attached to first and second internal housings 20a and 20b, providing easy access to the inside of ERV 10, wherein front side panel 16, back side panel 17, and bottom panel 18 may be more permanently attached to first and second internal housings 20a and 20b. It is understood that external housing 12 may take on many different embodiments without departing from the spirit and scope of the present invention.

The ERV may be insulated to prevent condensation and heat transfer where it is not desirable. Located between inside side access panels 14 and 15 and the internal housing 20a and 20b are optional side insulation panels 60a and 60b, which may seat up against a peripheral edge 19 of the internal housings 20a and 20b. When first and second internal housings 20a and 20b are connected together to form a single unit internal housing, the internal housing may include filter openings 92 and 93 (FIGS. 2 and 3) to allow optional filters 90 and 91 to be placed inside ERV 10 into supply chamber 21a and return chamber 22b, respectively. In the exemplary embodiment, before top access panel 13 is attached to the internal housing, first and second filter openings insulation panels 63 and 62 are optionally placed over filter openings 92 and 93, respectively. These insulation panels 60a, 60b, 62, and 63 may be fabricated from any known insulating materials. In one exemplary embodiment of the present invention, the insulation panels 60a, 60b, 62, and 63 are fabricated from a polymeric material, for example, high density, expanded polystyrene.

First and second internal housings 20a and 20b may be fabricated such that it integrates both an insulating function (to prevent condensation and frost) and mechanical support function (i.e., support of the internal components such as motors, fans, etc., required for the unit as a whole). In one exemplary embodiment of an internal housing (e.g., first and second internal housing 20a and 20b) for an ERV capable of providing both an insulating function and a mechanical support function, the internal housing is fabricated from a structural insulating polymer. This structural insulating polymer may have a material density of greater than about 2 lb/ft$^3$. In another exemplary embodiment, the structural insulating polymer may have a material density including but not limited to from about 2 lb/ft$^3$ to about 8 lb/ft$^3$. For example, first and second internal housings 20a and 20b may be fabricated from a structural insulating polymer such as high-density, expanded polystyrene having a material density of about 6 lb/ft$^3$.

Since first and second internal housings 20a and 20b are fabricated from a structural insulating polymer in this particular exemplary embodiment, first and second internal housings 20a and 20b may be formed using a single mold and then assembled to form a single unit internal housing (FIG. 2). First housing 20a may include a plurality of connection protrusions 27a and connection apertures 28a to insert into or receive corresponding connection apertures 28b and connection protrusions 28b of second housing 20b, respectively. In the embodiment shown, these connection protrusions and apertures are positioned around the perimeter edge of the first and second internal housings. One or more of these protrusions 27a and 27b may be tapered such that its diameter may be slightly larger than the diameter of the corresponding aperture. This interference fit provides both latitudinal and longitudinal stability when the two halves are mated together. These connection protrusions and apertures may be inexpensively molded directly into the first and second internal housings during the molding process. Such optional connection protrusions and apertures allow first and second internal housings 20a and 20b to snap together. In addition, an axle hole 29 may also be fabricated into the internal housings during the molding process. In addition, any other desired holes, cavities, protrusions, etc., may be formed into the internal housing during the molding process such as axle hole 29. This eliminate any additional drilling and machining requirements found in conventional ERVs.

First and second internal housings 20a and 20b are molded such that when they are assembled they form a supply inlet chamber 21a fluidly connected to a supply outlet chamber 21b and a return inlet chamber 22b fluidly connected to a return outlet chamber 22a. The supply inlet chamber 21a and supply outlet chamber 21b fluidly connect supply inlet 23 to supply outlet 24. Similarly, return inlet chamber 22b and return outlet chamber 22a fluidly connect return inlet 25 to return outlet 26. Supply inlet chamber 21a, supply outlet chamber 21b, supply inlet 23, supply outlet 24, return inlet chamber 22b, return outlet chamber 22a, return inlet 25, and return outlet 26 are preferably formed during molding of first and second internal housings 20a and 20b.

To efficiently move air into and out of the internal housing, first and second internal housings 20a and 20b may include fan inlets and outlets (i.e., supply inlet 23, supply outlet 24, return inlet 25, and return outlet 26) configured to maximize airflow and reduce noise. Because the exemplary embodiment of the present invention allows for identical first and second internal housings 20a, 20b (FIG. 4) to be formed from a single mold, inlets 23 and 25 and outlets 24 and 26 have close tolerances and outlets 24 and 26 are aerodynamic to maximize the air flow through the internal housing and reduce the noise produced by ERV 10 during operation. As described above, first and second internal housings 20a and 20b may also include filter openings 92 and 93 formed into the housings such that filters 90 and 91 may inserted into (and/or removed) from the supply chamber 21a and return chamber 22b upstream of the heat exchanger 30. These filters filter the air entering into ERV 10 before it moves through heat exchanger 30. In addition, optional transition covers 27a and 27b may be attached to first and second internal housings 20a and 20b, respectively, at the supply outlet chamber 21b and return outlet chamber 22a and enclosed within side access panels 14 and 15 as shown in FIG. 2. Such transition covers may be made from any material such as plastic, metal, composites, or any combination thereof. In the exemplary embodiment, the transition covers are fabricated from high density, expanded polystyrene.

A variety of molding methods may be used in the fabrication of the housing, including but not limited to injection molding, thermo forming, casting or any other technique known to one of ordinary skill in the art. Because ERV 10 has a housing material that provides both structural support and insulation and can be molded from a single mold, it is relatively inexpensive to manufacture compared to conventional ERVs. In addition, the molded internal housing provides ERV 10 with maximized air flow and reduced noise production relatively inexpensively.

Figure 7:
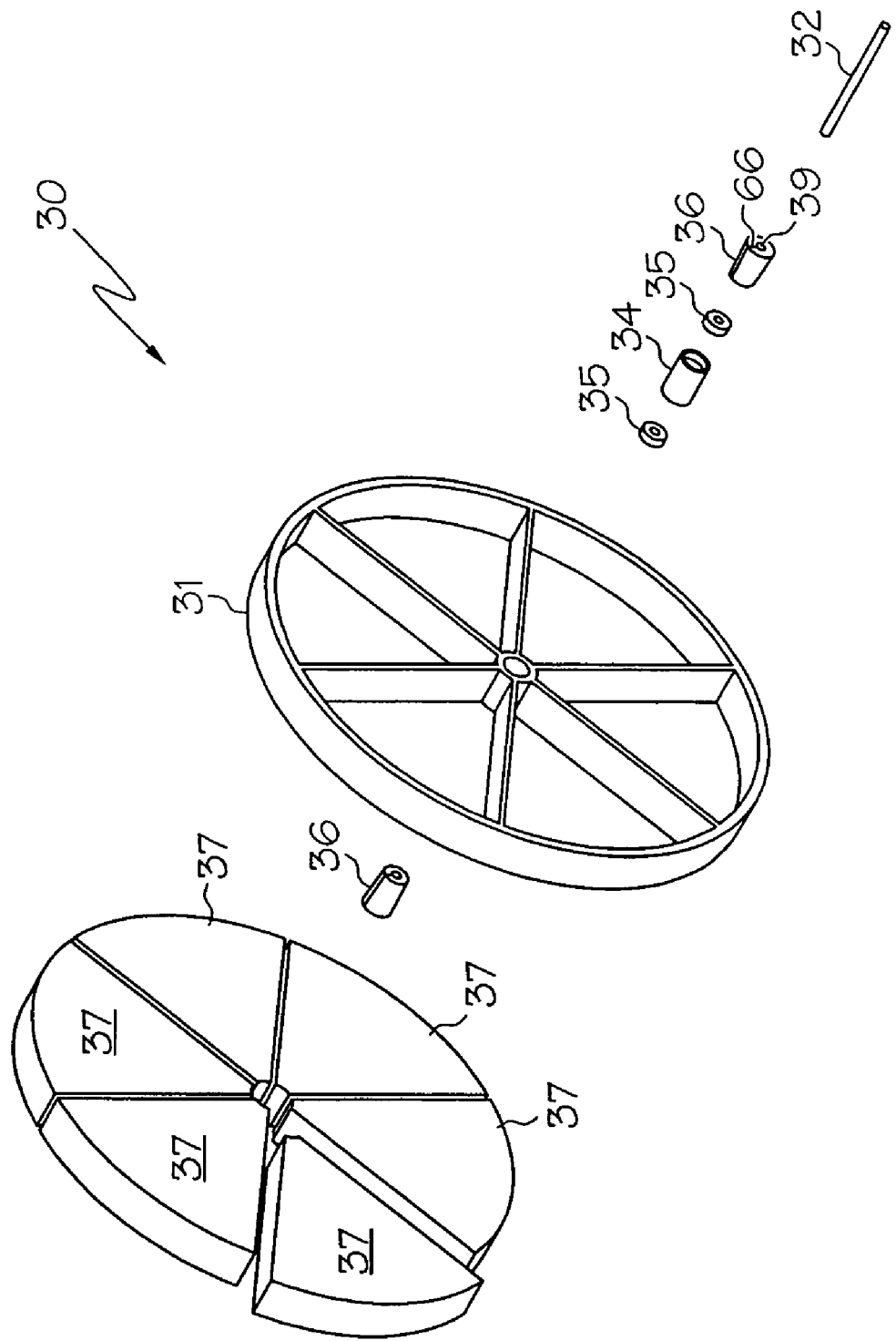
FIG. 7 is an exploded, perspective view of an exemplary embodiment of a rotary heat exchanger assembly of the ventilator illustrated in FIG. 1.

Referring to FIGS. 6-9, the exemplary embodiment of ERV 10 includes a rotary wheel heat exchanger 30. Heat exchanger 30 may be any conventional or yet-to-be developed heat exchanger without departing from the spirit and scope of the present invention. Heat exchanger 30 is mounted and enclosed between first and second internal housings (20a, 20b) such that it may rotate about a central axis 38 between supply chambers (21a, 21b) and return chambers (22a, 22b). Heat exchanger 30 is positioned within the internal housing such that it intersects both supply and return chambers. Heat exchanger 30 may include a heat exchanger wheel 31 with heat transfer material 37 disposed within the wheel's circumference. Optionally, heat transfer material 37 is pie-shaped to fit within the spokes of wheel 31 (FIG. 7). The heat transfer material may be capable of acting as a filtration material to provide filtering of the air streams flowing through the heat exchanger. The heat transfer material may be any conventional or yet-to-be developed heat transfer/filtration materials without departing from the spirit and scope of the present invention.

Figure 8:
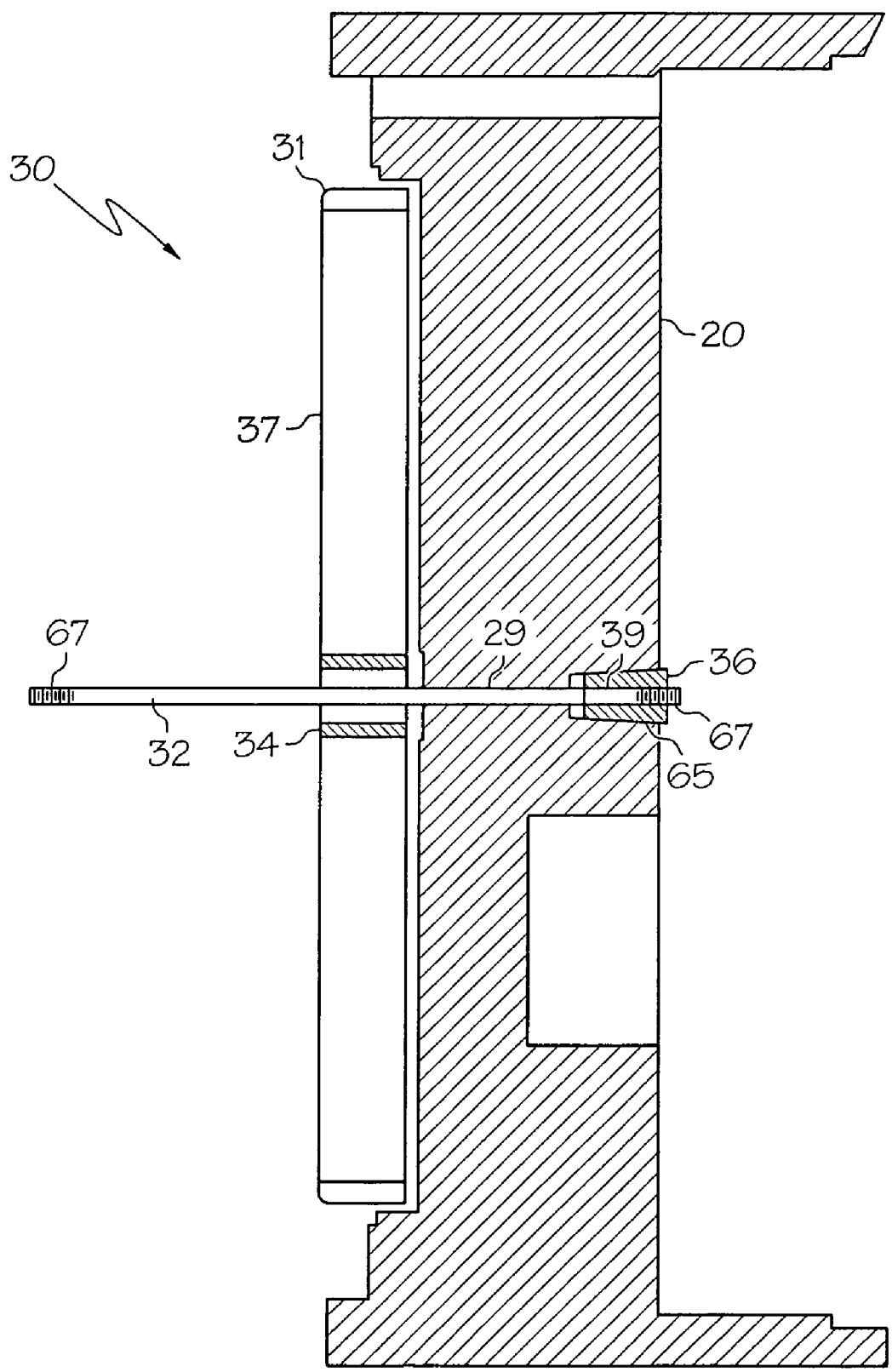
FIG. 8 is a cross sectional view of an exemplary embodiment of the second internal housing and rotary heat exchanger of the ventilator illustrated in FIG. 1.
Figure 9:
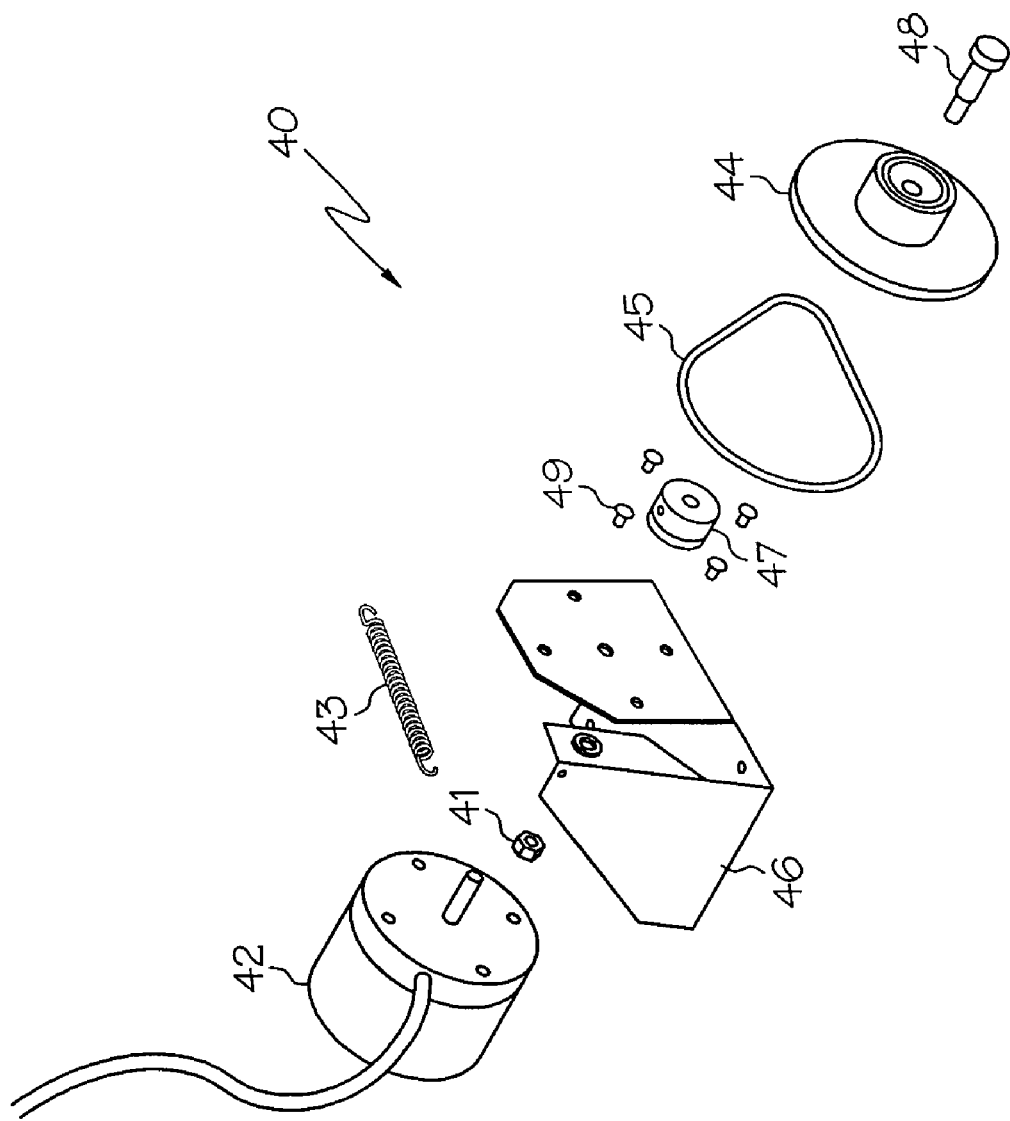
FIG. 9 is an exploded, perspective view of an exemplary embodiment of a heat exchanger motor assembly of the ventilator illustrated in FIG. 1.

In the exemplary embodiment shown in FIGS. 6-9, wheel 31 may be mounted on a ball bearing hub 34, which is rotatably mounted onto an axle 32. First and second internal housings (20a, 20b) both include clearance holes 29a and 29b, respectively, such that when heat exchanger 30 is sandwiched between the first and second internal housings, axle 32 protrudes through each internal housing via the clearance holes. Located at the end of each half's respective clearance hole 22 is a larger tapered hole 65. Tapered inserts 36 are mounted onto each end of axle 32. Such tapered inserts include a coaxial-through aperture 39. This aperture allows axle 32 to form a tight fit (e.g., running slide class fit) within tapered inserts 36. In addition, each tapered insert 36 may include a split 66 on one or both sides to enable it to grip axle 32 as tapered insert 36 is mechanically pulled into tapered hole 24 of housing 12. As shown in FIG. 8, axle 32 may include thread ends 67 such that a nut may be threaded and tightened onto each end to mechanically pull the tapered inserts into tapered holes 24 and hold the entire assembly (first and second internal housings (20a, 20b), heat exchanger 30, etc.) together. This method of attaching heat exchanger 30 to housing 12 allows for the wheel to be accurately positioned in a concentric manner within housing 12 for each assembly without the use of highly toleranced parts and without the need for highly skilled labor. Other methods of movably connecting heat exchanger 30 to first and second internal housings 20a and 20b may be used without departing from the spirit and scope of the present invention.

ERV 10 may include a heat exchanger motor to drive the rotation of heat exchanger 30 (i.e., rotate wheel 31) about central axis 38. In the exemplary embodiment shown, ERV 10 includes a heat exchanger motor assembly 40 that includes a heat exchanger motor 42. Heat exchanger motor 42 rotatably drives a small belt pulley 47, which in turn, drives a driver roller pulley assembly 44 via a pulley 45. The components of the heat exchanger motor assembly may be attached to a drive roller/motor mount 46 and assembled using conventional locknuts 41 and machine screws 49. Driver roller pulley assembly 44 may be affixed to the assembly using a shoulder screw 48. Motor mount 46 may be mounted to the internal housing (either 20a and 20b) of ERV 10 using a snap-fit, bolts, screws, or any other method known to one or ordinary skill in the art. The motor mount is mounted to the internal housing such that driver roller pulley assembly 44 engages the outer circumference of heat exchanger wheel 31 in order to rotate the wheel. The driver roller pulley assembly may be mounted such that it is biased against the wheel. For example, a spring 43 may be attached to the motor assembly to bias the driver roller pulley assembly against the wheel. Although any type of motor may be used with the present invention, in this particular However, it is understood that the heat exchanger motor and its connections with heat exchanger 30 may be any conventional or yet-to-be developed motor and motor connections as known to one of ordinary skill in the art. In one exemplary embodiment, heat exchanger motor 42 may be a variable speed, electronically commutated motor.

Although a rotary wheel-type heat exchanger is shown and described in the exemplary embodiment, it is understood that heat exchanger 30 may be any type of conventional or yet-to-be developed heat exchanger used in ERV's as known to one of ordinary skill. For example, ERV 10 may include but not be limited to the following heat exchangers: rotating heat recovery, enthalpic wheel, a cross-flow, counter-flow, or any other type of flat plate or rotary wheel heat exchanger.

ERV 10 includes supply fan 54a fluidly connected to supply inlet chamber 21a and supply outlet chamber 21b, which may be driven by supply motor 52a. In addition, ERV 10 includes return fan 54b fluidly connected to return inlet chamber 22b and return outlet chamber 22a, which may be driven by return motor 52b. Such supply fan 54a and motor 52a may comprise a single unit (e.g., a supply blower unit) and such return fan 44 and motor 46 may also comprise a single unit (e.g., a return blower unit). Alternatively, both the supply fan and return fan may be driven by one motor. The supply fan and motor and return fan and motor may be any conventional or yet-to-be developed fan and motor as known to one of ordinary skill in the art. Moreover, the supply and return motors may be connected to the supply and return fans in any manner known to one of ordinary skill in the art.

Figure 10:
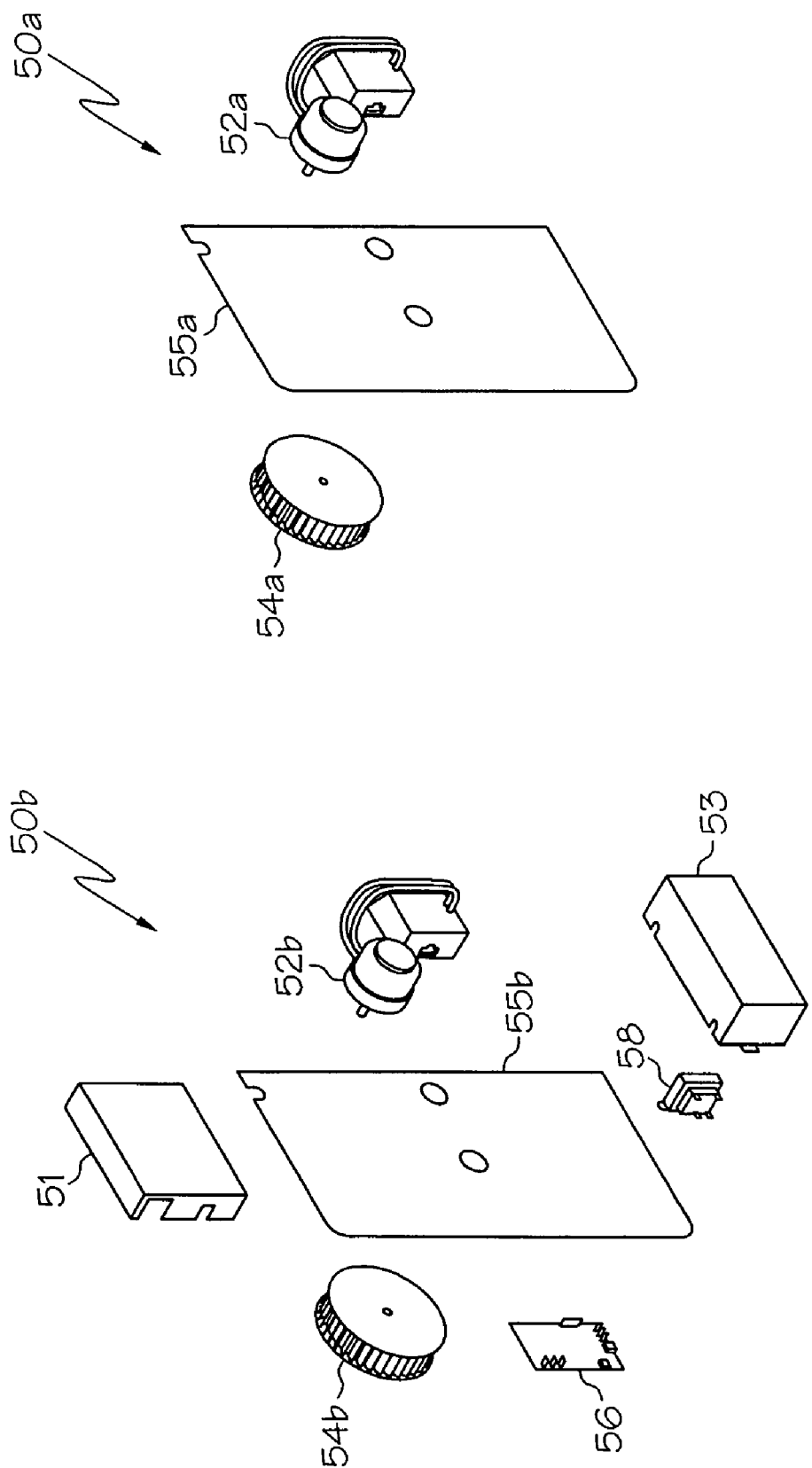
FIG. 10 is an exploded, perspective view of an exemplary embodiment of a supply fan and motor assembly and a return fan and motor assembly of the ventilator illustrated in FIG. 1.

FIG. 10 shows an exemplary embodiment of supply blower 50a and return blower 50b. Supply blower 50a may include a supply fan 54a driven by a supply motor 52a, which are attached to a motor plate 55a. Similarly, return blower 50b may include a return fan 54b driven by a return motor 52b, which are attached to a motor plate 55b. Optionally, return blower 50b may also include a wheel driver 56 and transformer 58 electrically connected to the motors to assist in the driving of the supply and return motors. The wheel driver and transformer may also include cover plates 51 and 53 for protection. Supply and return motor plates 55a and 55b (including the supply and return motors) may be attached to internal housings 20a and 20b, respectively, as known to one of ordinary skill in the art. In the exemplary embodiment shown, each of the internal housings 20a and 20b have nine pre-molded bolts holes 68 (FIG. 5) that align with bolt holes in the motor plates such that bolts may be used to bolt the motor plates to the internal housings.

In the exemplary embodiment, both the supply and return motors 52a and 52b are variable speed, electronically commutated motors, each separately connected to supply and return fan 54a and 54b, respectively. This allows supply motor 52a to drive supply fan 54a independent of return motor 52b, and return motor 52b to independently drive return fan 54b. When driven by the supply motor, supply fan 54a circulates a first stream of air into supply inlet 23 and through supply inlet chamber 21a and heat exchange/filtration material 37 of heat exchanger 30. The first stream of air exits the heat exchange/filtration material 37 and then circulates through supply outlet chamber 21b and out of supply outlet 16. Similarly, return motor 52b drives return fan 54b such that it circulates a second stream of air into return inlet 25 and through return inlet chamber 22b and material 37. The second stream of air exits the material 37 into return outlet chamber 22a and through return outlet 26. As heat exchanger wheel 31 rotates between the supply stream of air and the return stream of air (e.g., within supply and return chambers), heat exchanger 30 transfers heat and moisture from one stream of air to the other. This transfer of heat and moisture between supply and return air streams allows ERV 10 to control environmental conditions such as temperature, humidity, and/or pressure inside the structure (e.g., indoor conditions).

Figure 11:
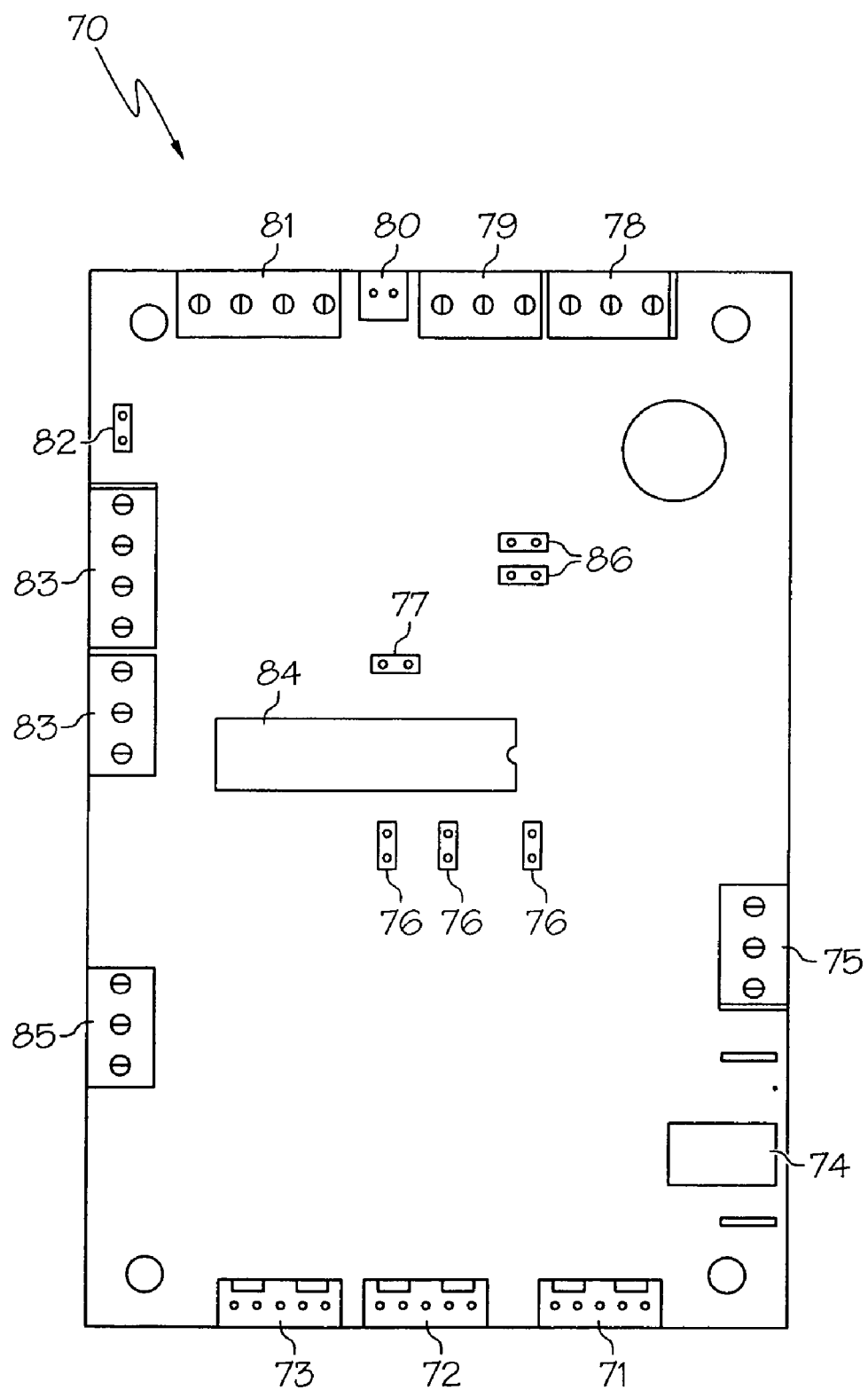
FIG. 11 is a plan view of an exemplary embodiment of a three motor controller of the ventilator illustrated in FIG. 1.
Figure 12:
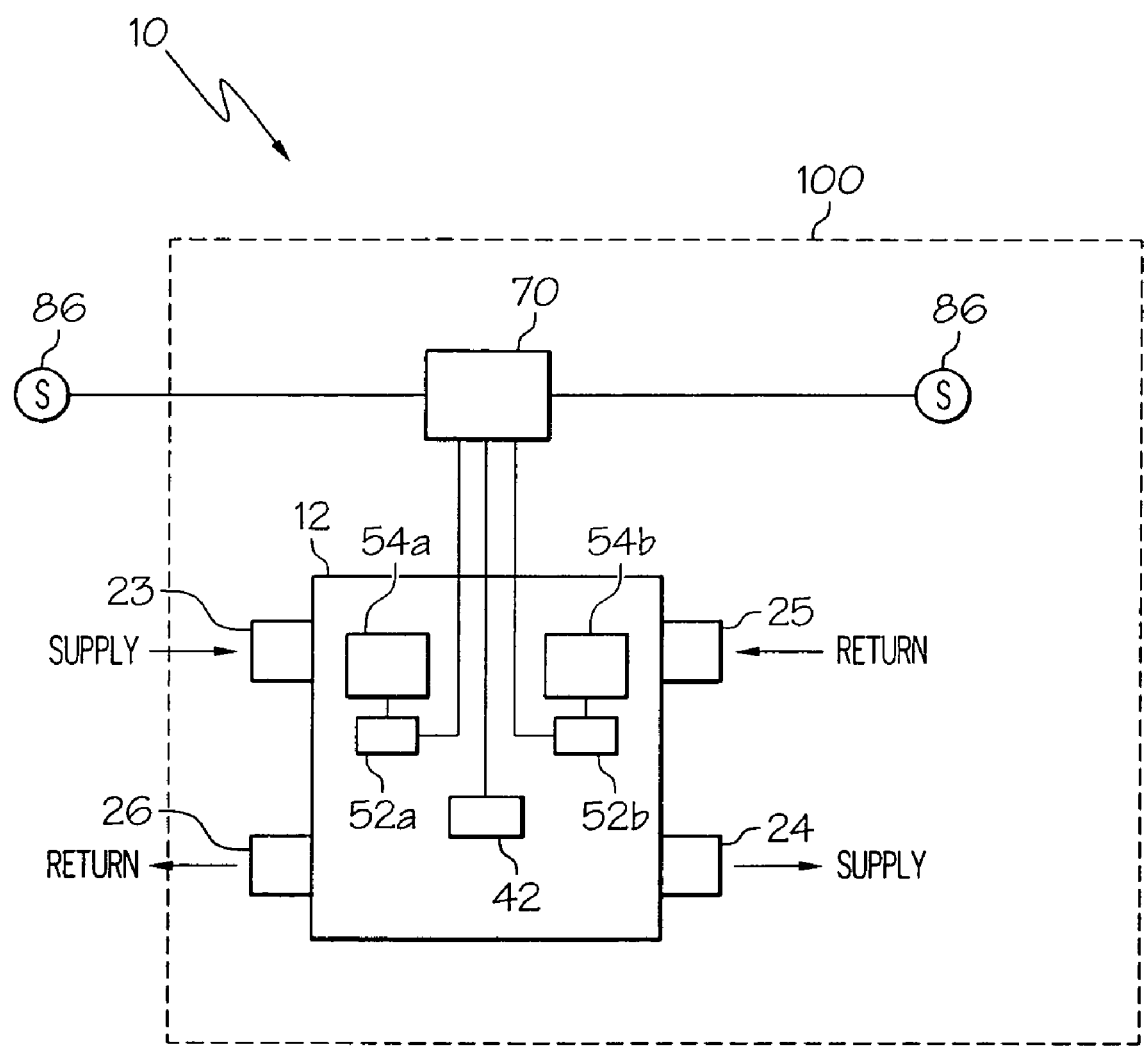
FIG. 12 is a schematic of an exemplary embodiment of the energy recovery ventilator of the present invention.

Referring to FIG. 11, ERV 10 may include a controller 70 connected to supply motor 52a, return motor 52b, and/or heat exchanger motor 42. Controller 70 is capable of independently or separately controlling the operation of each motor. As described above, conventional heat and energy recovery ventilators have controlled either motor speed (RPM) or motor power draw (applied torque) to attempt to balance air streams, controller 70 of the present invention may be configured to control both motor speed and applied torque and then relates this to data that will give the system volumetric flow control of both air streams (e.g., supply and exhaust). Controller 70 may include a heat exchanger wheel control output 71, Fresh air in blower output 72, stale air out blower output 73, relay control option 74, 0-10 VDC building control units 75, defrost option selection 76, control input selection 77, 24 VAC line inputs 78, 24 VAC return inputs 79, temperature sensor input 80, optional inputs 81, wall controller selection 82, wall controller inputs 83, control program/memory chip 84, air flow offset selection 85, and a pressure set point-air flow offset selection 86. One such exemplary controller that may be used in the practice of exemplary embodiments of the present invention is a DCC7540 three motor ERV controller manufactured by CROTEC Electronic Controls, Oliver Springs, Tenn. It is understood that more than one controller may be used with the present invention, e.g., one controller connected to each motor, without departing from the spirit and scope of the present invention.

A desired environmental condition inside a structure 100 may be entered and stored within controller's 70 control program/memory chip 84. Such a desired environmental condition may include, but is not limited to, a temperature, a humidity, and/or balanced air flow and/or pressure. The desired inside environmental condition may also include a pressure differential between inside and outside of structure 100 (e.g., positive pressure differential) or balanced (or imbalanced) air flow between the supply and return air streams. Controller 70 and sensors 86 (described in greater detail below) may be configured (e.g., programmed) to continuously monitor and maintain this desired environmental condition inside structure 100.

Controller 70 may be further configured to separately (i.e., independently) operate supply motor 52a, return motor 52b, and/or heat exchanger motor 42 in response to environmental condition(s) measured by sensor(s) 86 to maintain the desired inside environmental condition entered into controller 70. When controller 70 operates the motors in response to the measured environmental condition(s) from sensor(s) 86, it may include, but not be limited to, controlling or adjusting the torque, speed and/or rotation, stopping, starting, or any other operation of the motors. This separate or independent control and operation of the motors for controller 70 to independently adjust the flow (ft$^3$/min) of the supply air stream (by adjusting the supply blower motor speed and/or applied torque), of the return air stream (by adjusting return blower motor speed and/or applied torque), and/or of the rate of heat exchange (e.g., rotation of the heat exchanger wheel 31). As an example, since the heat exchange rate of heat exchange material 37 is known, controller 70 may be configured to adjust the rotation of heat exchanger wheel 31 and/or the speeds of supply and/or return fans (54a, 54b) based upon this know rate of heat exchange to control, affect or influence inside environmental conditions to try and maintain the desired environmental condition inside structure 100.

As discussed above, ERV 10 may include one or more sensors 86 connected to controller 70 to monitor and measure one or multiple indoor and/or outdoor environmental conditions. Sensor 86 may be any type of sensor or monitoring equipment for monitoring and measuring the environmental conditions, including but not limited to temperature sensors (e.g., thermometers, thermisters), air flow monitors, pressure sensors (e.g., transducers, differential pressure transducers, etc.), humidity sensors, and/or any other sensors known to one of ordinary skill in the art. Such a sensor(s) may measure an environmental condition inside structure 100 (e.g., air stream volumetric flow, indoor air temperature, humidity, and/or pressure), outside structure 100 (e.g., air stream volumetric flow, ambient or outdoor air temperature, humidity, and/or pressure), or a differential between inside and outside environmental conditions, and then provide this information to controller 70.

When measuring inside (e.g., indoor) and outside (e.g., outdoor) environmental conditions, sensor(s) 86 may be positioned such that it measures return and supply airstreams to monitor the inside and outside environmental conditions, respectively, positioned inside structure 100 and outside structure 60 to monitor the inside and outside environmental conditions, or any combination thereof. As described above, controller 70 may then use the measured environmental conditions to independently operate one or more of the three motors (i.e., supply 52a, return 52b, and/or heat exchanger 40) to independently adjust the operation of supply fan 54a, return fan 54b, and/or heat exchanger 30.

In one exemplary embodiment, ERV 10 includes humidity sensors 86 to monitor humidity inside and outside structure 100. Humidity sensors 86 are connected to controller 70, which may independently operate the three motors (i.e., supply motor 52a, return motor 52b, and heat exchanger motor 42). As described above, these motors independently drive supply fan 54a, return fan 54b, and heat exchanger wheel 31, respectively. A desired humidity level inside structure 100 may be entered into controller 70. Controller 70 is configured (e.g., programmed) to continuously monitor (e.g., measure) both the humidity inside and outside structure 100 via readings from sensors 86 and then to independently control/operate supply fan 54a, return fan 54b, and/or heat exchanger wheel 31 (based upon the known heat exchange rate of heat exchanger 30) such that ERV 10 may continuously and automatically try to influence the inside humidity to maintain the desired inside humidity.

In another exemplary embodiment, ERV 10 includes sensors 86 that measure pressure and temperature both inside and outside structure 100. Sensors 86 are connected to controller 70, which may independently operate supply motor 52a, return motor 52b, and heat exchanger motor 42 to drive supply fan 54a, return fan 54b, and heat exchanger wheel 31, respectively. Controller 70 is configured (e.g., programmed) to continuously monitor the pressure and temperature inside and outside of structure 100 via readings from sensors 86 and then to independently operate the supply fan, return fan, and/or heat exchanger to prevent frost in or on ERV 10. Controller 70 may operate these motors based upon the known heat exchange rate of heat exchanger 30. Controller 70 may also be configured to optimize sensible and latent heat recovery in structure 100 while maintaining frost-free operation in ERV 10 and a desired humidity within structure 100. In addition, controller 70 may be configured to accomplish this optimized heat recovery and frost free operation while structure 100 has a high relative humidity and the outdoor temperature is cold. Controller 70 may be further configured to perform the above tasks while continuing to supply fresh air into structure 100 and without creating a condition of house depressurization.

In still another exemplary embodiment, ERV 10 may be configured to provide economic cooling such as an economizer function. This configuration allows controller 70 to control the operation of ERV 10 to provide cooling to structure 100 in the most efficient manner. And, in some cases, the air conditioning in structure 100 may not have to operate due to the cooling provided by ERV 10 of this exemplary embodiment. In addition, ERV 10 can provide this economic cooling without de-pressurizing structure 100. In this embodiment, ERV 10 may include sensors 86 to monitor temperature, humidity, and/or pressure inside and outside of structure 100 and provide this measured environmental condition data to controller 70. As previously described above, controller 70 of this exemplary embodiment is configured to independently operate the three motors to drive the supply fan, return fan, and heat exchanger wheel to adjust the flow (ft$^3$/min) of supply and/or return air streams and/or to adjust the speed of rotary heat exchanger 30 (based upon the known heat exchange rate of heat exchanger 30) to provide the most economical cooling. This allows ERV 10 to maximize energy savings. For example, supply fan 54a may be circulating cooler outdoor air into structure 100 while return fan 5b4 is compensating by exhausting indoor air out of structure 100 to prevent structure 100 from de-pressurizing, while the rotation of heat exchanger wheel 31 is slowed down or even stopped.

Figure 13:
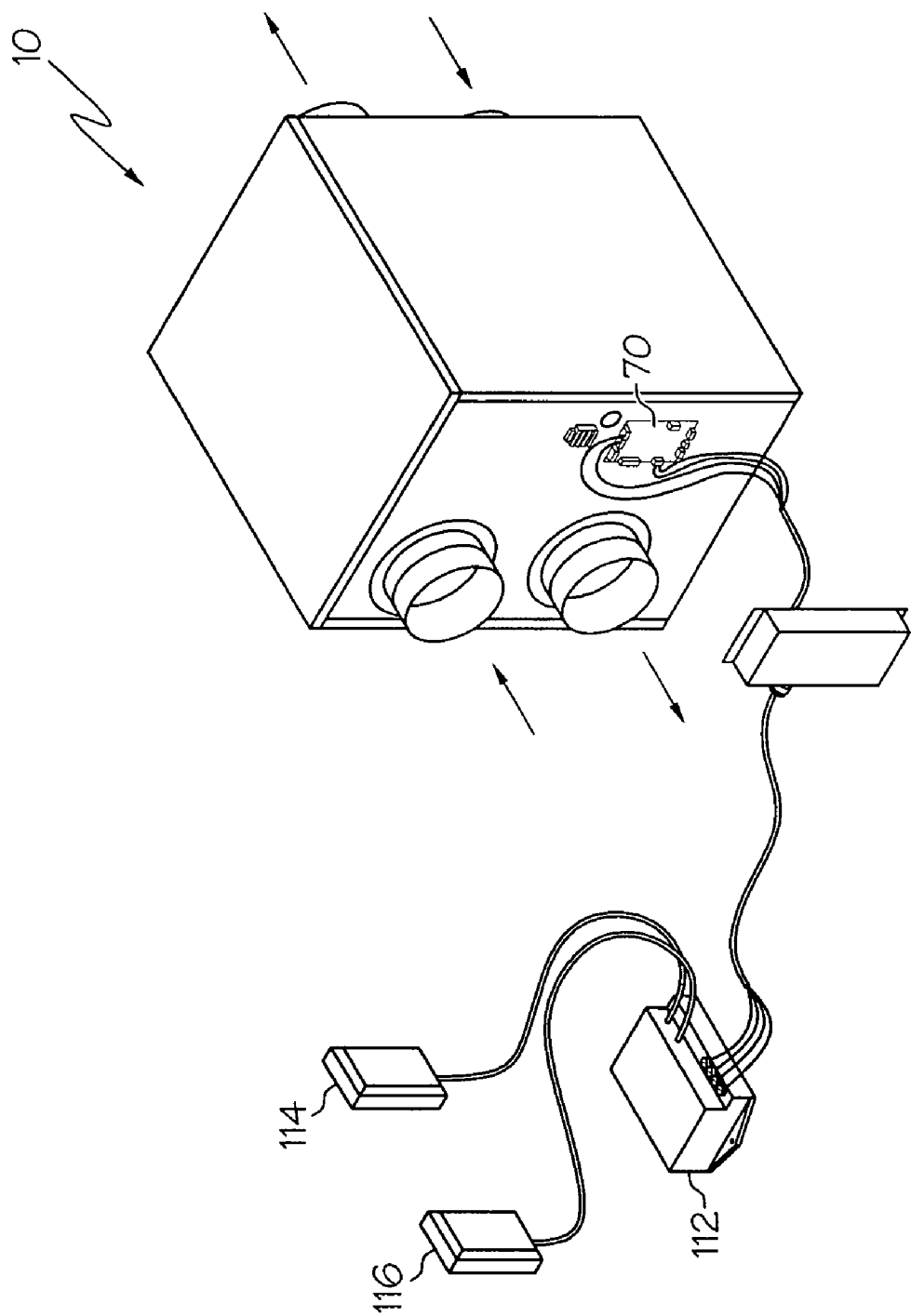
FIG. 13 is a perspective view of another exemplary embodiment of the pressure control energy recovery ventilator of the present invention.
Figure 14:
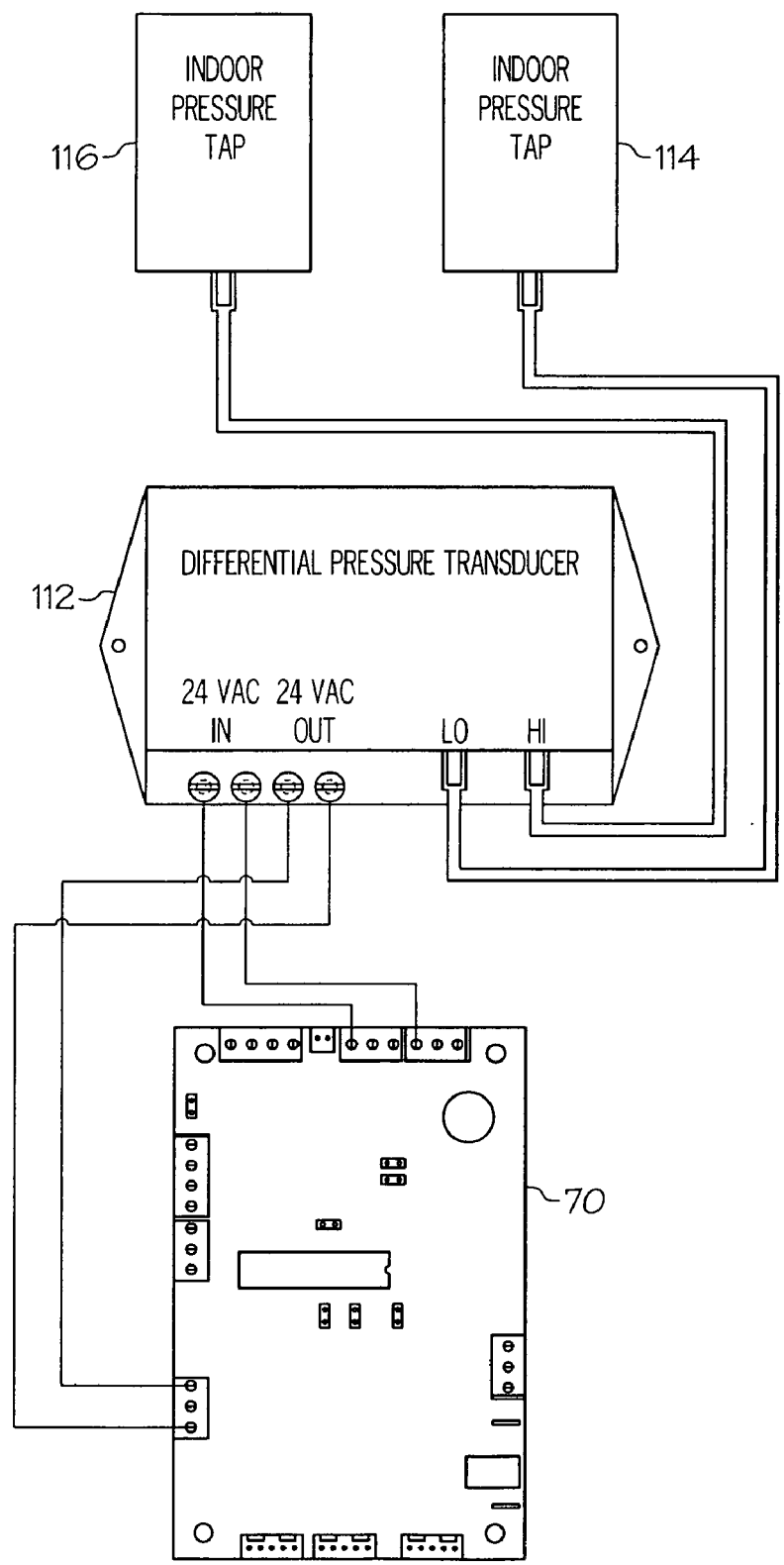
FIG. 14 is an electrical layout of the ventilator illustrated in FIG. 13.
Figure 15:
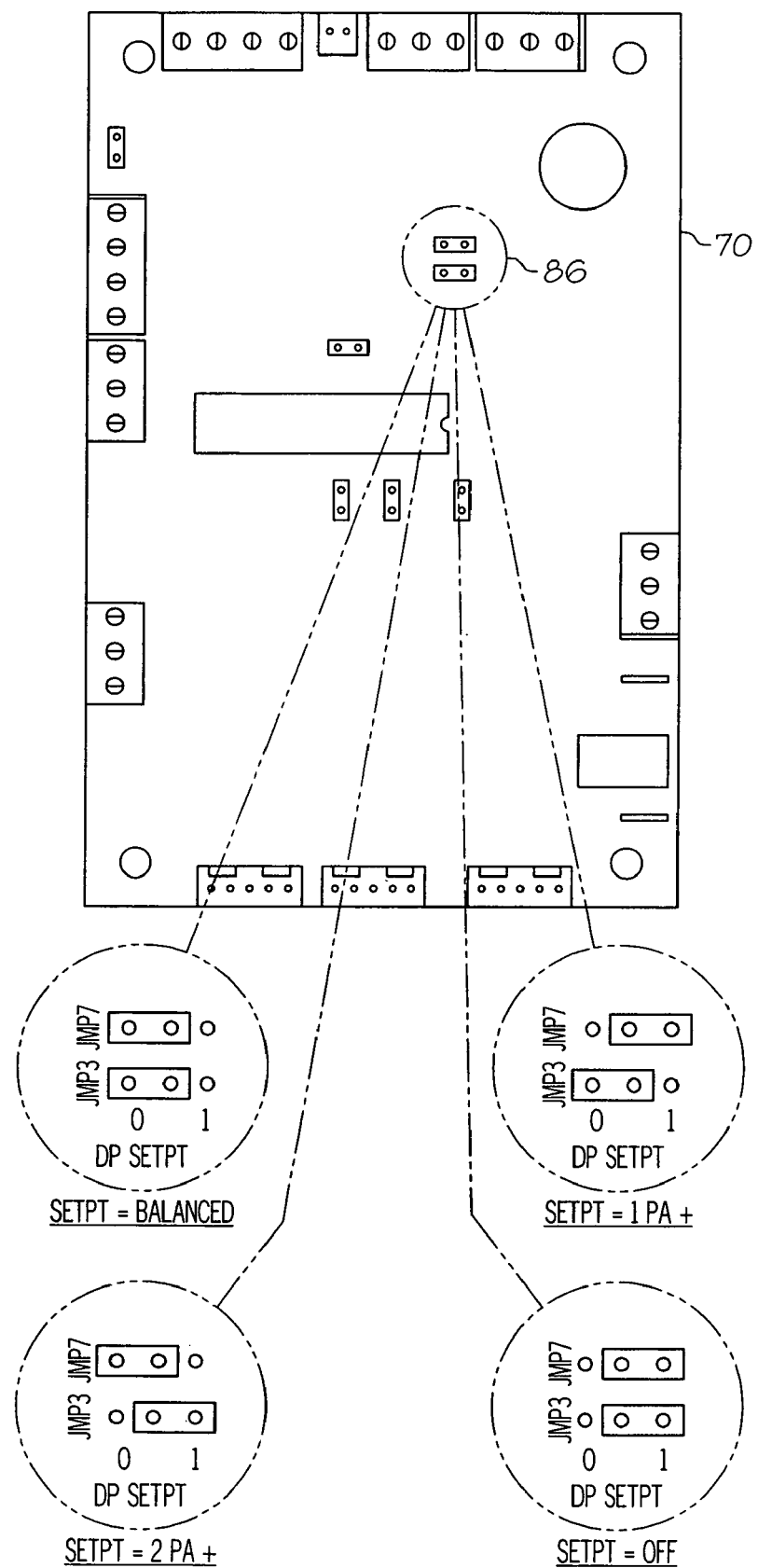
FIG. 15 is an exploded view of the pressure set point selector of the controller illustrated in FIG. 14.

In yet still another exemplary embodiment as shown in FIGS. 13-15, ERV 10, which may include a portion or all of the components and features described above, may also include a pressure transducer 112 and two pressure taps 114 and 116. AS shown in the FIGS., pressure transducer 112 is electrically connected to controller 70 and also connected to pressure taps 114 and 116. In the exemplary embodiment, controller 70 is configured to continuously monitor and maintain a desired differential pressure between the interior and exterior of structure 100 (e.g., balanced or slightly positive indoor pressure differential) to control moisture infiltration into the structures wall cavities, thus controlling mold growth. ERV 10 may also include a plate-type or rotary wheel-type heat exchanger, supply fan 54a driven by supply motor 52a, and return fan 54b driven by return motor 52b. ERV 10 may include humidity, pressure, and/or temperature sensors as well. In this exemplary embodiment, a pressure differential desired to be maintained between the interior and exterior of structure 100 may be entered into controller 70 (e.g., a zero pressure differential (balanced) or a slight positive pressure inside structure 100 relative to a pressure outside structure 100). Based upon the continuously measured pressure differential between the interior and exterior of structure 100 and/or humidity and temperature measured inside and outside structure 100, controller 70 may control the speed and/or applied torque of supply motor 52a and return motor 52b to adjust the flow (ft$^3$/min) of the supply and return air streams, respectively, to maintain the desired pressure differential between inside and outside of structure 100. Again, the heat exchanger's rate of heat exchange may be factored into the controller's operational control of the three motors to maintain the desired differential pressure.

Accordingly, while some of the alternative embodiments of the heat and energy recovery ventilator and methods have been discussed specifically, other embodiments will be apparent or relatively easily developed by those of ordinary skill in the art. Accordingly, this invention is intended to embrace all alternatives, modifications and variations that have been discussed herein, and others that fall within the spirit and scope of the claims.

What is claimed is:

1. An energy recovery ventilator comprising:
   a housing comprising
      a first integral half formed from a molded high density expanded polystyrene having a density of greater than about 2 lb./ft$^3$, the polystyrene integrally forming
         a first half supply inlet, a first half supply inlet chamber, a first half return inlet, a first half return inlet chamber, a return outlet chamber, and a return outlet and
      a second integral half matingly engaged to the first integral half and formed from a molded high density, expanded polystyrene having a density of greater than about 2 lb./ft$^3$, the polystyrene integrally forming
         a second half supply inlet, a second half supply inlet chamber, a second half return inlet, a second half return inlet chamber, a supply outlet chamber, and a supply outlet, wherein
         the first half and second half supply inlets form the supply inlet,
         the first half and second half supply inlet chambers form the supply inlet chamber,
         the first half and second half return inlets form the return inlet, and
         the first half and second half return inlet chambers form the return inlet chamber;
      a heat exchanger comprising an axle having a first end connected to the first integral half and a second end connected to the second integral half, the heat exchanger adapted to rotate about the axle between the supply inlet chamber and the return inlet chamber;
      a first fan to circulate a first air stream through the supply inlet, supply inlet chamber, supply outlet chamber, and supply outlet;
      a second fan to circulate a second air stream through the return inlet, return inlet chamber, return outlet chamber, and return outlet; and
      a fan motor driving the first and second fans.

2. The ventilator of claim 1, further comprising:
   first and second tapered axle openings disposed in respective first and second integral halves, wherein the axle is positioned within the housing such that the first end is inserted into the first tapered opening and the second end is inserted into the second tapered opening; and
   first and second complementary tapered inserts disposed within the first and second openings respectively, and affixed to the respective first and second ends of the axle.

3. The ventilator of claim 1, wherein said expanded polystyrene has a material density from about 2 lb./ft$^3$ to about 8 lb./ft$^3$.

4. The ventilator of claim 1, wherein said fan motor is comprised of
   a first fan motor connected to said first fan; and
   a second fan motor connected to said second fan.

5. The ventilator of claim 1, further comprising a heat exchanger motor driving said heat exchanger.

6. The ventilator of claim 5, further comprising:
   a controller in communication with said first and second fan motors and said heat exchanger motor;
   a sensor in communication with said controller, said sensor configured to measure an environmental condition; and
   wherein said controller is configured to independently control both motor speed and applied torque of said first and second fan motors and the speed of said heat exchanger motor in response to said measured environmental condition.

7. The ventilator of claim 6, wherein said environmental condition is selected from the group consisting of humidity, temperature, and pressure.

* * * * *